Nov. 16, 1954 C. SMITH II 2,694,578

INSERT FOR ORIENTING THE SPINDLE APERTURE
OF DISK-TYPE PHONOGRAPH RECORDS
Filed May 13, 1950

INVENTOR.
CHARLES SMITH II

BY William Cleland

ATTORNEY

United States Patent Office 2,694,578

Patented Nov. 16, 1954

2,694,578

INSERT FOR ORIENTING THE SPINDLE APERTURE OF DISK-TYPE PHONOGRAPH RECORDS

Charles Smith II, Akron, Ohio

Application May 13, 1950, Serial No. 161,803

2 Claims. (Cl. 274—42)

This invention relates to inserts for orienting the usual center apertures of disc-type phonograph records.

In the past, it has been found that disc-type phonograph records, upon being subjected to repeated usage on automatic record players tended to chip around the central apertures thereof to a point where enlargement of the apertures prevented centering on the usual player turntable. As a result of such damage the useful life of such records has been terminated or greatly diminished.

It is one object of this invention to provide means for strengthening or re-establishing the central apertures of disc-type records, and thereby to increase the useful life of said records materially.

It is a further object of this invention to provide an insert member, particularly adapted for easy repair of used records without requiring the use of special skills or tools.

These and other objects of the invention will be self-evident from the following brief description and the accompanying drawings.

Figures 1, 2, 3, 4, 5:
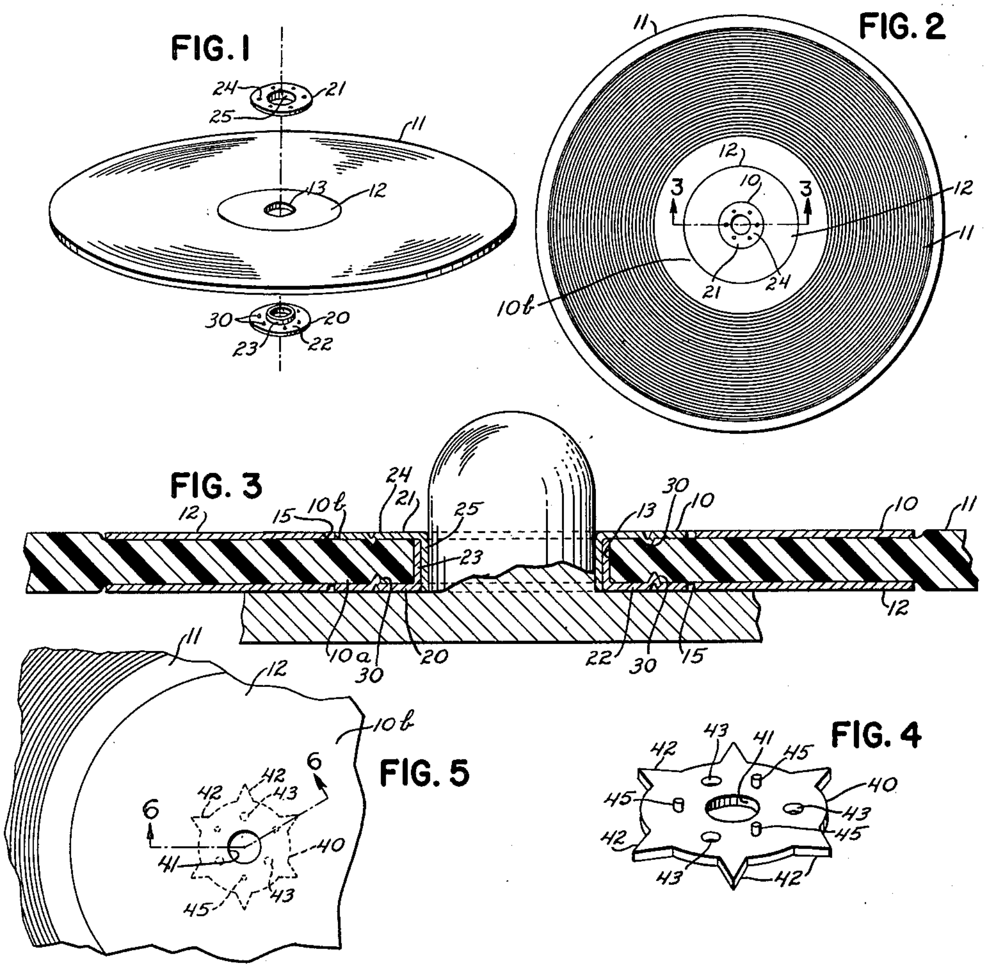
Figure 1 is a perspective view of an insert embodying the features of the invention.
Figure 2 is a top plan view of a record having one of the improved inserts incorporated therein.
Figure 3 is a vertical section, in enlarged scale, taken on the line 3—3 of Figure 2.
Figure 4 is a perspective view of a modified form of insert.
Figure 5 is a plan view of the modified form shown in Figure 4.
Figure 6:
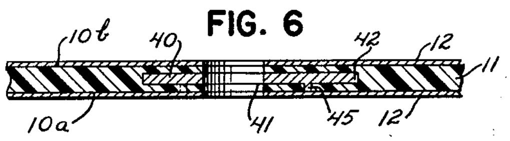
Figure 6 is a vertical section taken on the line 6—6 of Figure 5.

Referring particularly to Figures 1 to 3 of the drawing, there is illustrated one form of insert 10, embodying the features of the invention, the same being incorporated at the center of the usual disc-type phonograph record 11 for orienting and strengthening the usual central spindle receiving aperture 13 thereof. The record 11, which is of the usual type molded from wax or like plastic material, has paper disc labels 12, 12 on opposite sides at the center thereof.

The insert means 10 may include a pair of oppositely disposed, cooperating insert members 20 and 21, one of which comprises a relatively flexible disc 22 engageable with one side 10*a* of the record and having an inturned annular flange 23 extending integrally therefrom for reception through said spindle hole 13. The second insert member 21, also has a relatively thin flexible disc 24 engageable with the opposite side 10*b* of the record 11 and has an inturned annular flange 25 extending integrally therefrom, the same being telescopically receivable by press fit within the annual flange 23, the height of the annular flanges 23 and 25 being approximately equal to the thickness of the record 11, whereby the inner faces of the discs may be engaged with opposite sides 10*a* and 10*b*, respectively, of the record 11.

As best shown in Figure 3, the label portions 12, 12 may be provided with relatively large central apertures providing counterbores 15, 15 for facilitating flush reception of the thin flexible discs 22 and 24, therein, whereby a substantially smooth and uninterrupted outer surface is presented, inasmuch as the thicknesses of the label 12 and the discs 22 or 24 are approximately the same. In the event that the label 12 is not provided with the necessary enlarged central aperture as above described, it is manifest that the same may be cut out by means of a suitable cutting tool. Sharp protuberances 30, 30, may be provided on the record engaging surfaces of the discs members 22 and 24, respectively, the same being adapted to be embedded within the record face when the respective annular flanges 23 and 25, are positioned as previously described, the same thereby serving to anchor the insert members 20, and 21, respectively to the record 11. For firmly securing the insert members to the respective record faces a thin layer of cement is also placed between the discs 22 and 24 and the record 11, in any suitable manner.

The amount of clearance between the aperture 13 and the turn-table spindle, by necessity, being relatively small it is essential that the thickness of the inturned flanges 23 and 25 be held to a minimum so that the spindle may be freely received within the central aperture of a record in a properly centered relationship. Because the diameter of the aperture in records may vary with respect to various manufacturers specifications, it may, in some instances, be necessary to ream out the aperture slightly with a suitable tool, so as to provide the requisite clearance. It is to be remembered however, that the amount of enlargement required is relatively slight and only necessary in certain instances and that there is no requirement for a special diameter hole in any event.

In use of the improved insert 10 as for restoring the usefulness of a used record 11 having an enlarged center aperture 13, the disc of either insert member 20 or 21 may be first placed on the record face so that the flange opening and the record aperture 13 are in substantial alignment. A suitable cutting implement may then be used to cut or scribe through the paper label 12 on both sides of the record, by following around the periphery of the disc in the manner previously described. The paper in the area inwardly of the scribed circle may then be removed to provide the counterbores 15, 15.

The insert member 20, after a suitable application of cement thereto as described above, may then be fitted with the flange 23 thereof within the aperture 13 and with the disc 22 in firmly cemented contact with the record surface 10*a* (see Figure 3). When protuberances 30, 30 are provided on the discs of the members 20, 21 respectively, sufficient application of pressure will cause the same to be anchored within the record surface. The other insert member 21 is similarly applied to the record, with the annular flange 25 press-fitted into the annular flange 23 of insert member 20 and the disc 24 firmly cemented to the other side 10*b*, of the record.

A record thus repaired may be used for an indefinite period without further damage to the spindle aperture. It will be obvious that the improved insert may likewise be utilized on new records.

As a modified form of the invention, there is illustrated in Figure 4, a thin generally flat disc-like metallic insert 40 centrally incorporated in the record material intermediate the opposite faces 10*a* and 10*b*, thereof, the same being provided with a central aperture 41, corresponding in size and location to the usual central aperture 13 of the record 11. Radially outwardly extending protuberances 42, 42, and a plurality of relatively small apertures 43, 43, extending between opposite faces of the disc-like insert 40 are provided to anchor the disc within the record material.

For the purpose of positioning the insert 40 in the record making mold (not shown) during the process of manufacture of the record, so that the insert will be centrally intermediate the opposite faces 10*a*, and 10*b*, of the record, a plurality of tangs 45, 45 are provided to extend perpendicularly from the opposite faces of the insert.

Records so provided with the disc insert will have the advantage of being wear resistant at the central aperture, even though the records are subjected to repeated usage on automatic player machines.

Figure 7:
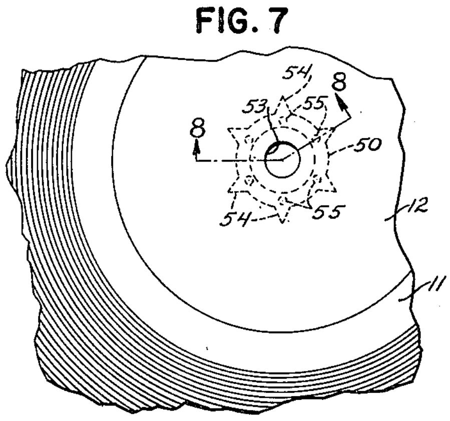
Figure 7 is a plan view of another modified form of the invention.
Figure 8:
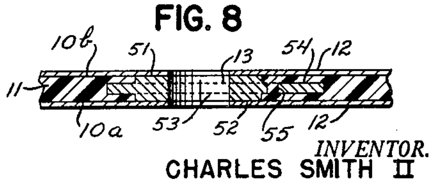
Figure 8 is a vertical section taken on the line 8—8 of Figure 7.

Another modified form of the invention is shown in Figures 7 and 8, wherein, a thin, generally flat disc-like insert 50 of metal or similar material is incorporated in the record material intermediate the opposite faces of the record. The insert 50 has central bosses 51, 52, on opposite sides thereof and a central aperture 53 therethrough corresponds in size and location to a central aperture 13 of the record proper. The bosses 51, 52, facilitate locating the insert 50 intermediate the opposite faces 10*a* and 10*b* (during the manufacture of the record). As best shown in Figure 8, the bosses 51 and 52 may be covered by the label portions 12, 12, but it is obvious that the thickness of the central portion of the insert could be varied to have the outer faces thereof presented flush with the label outer surfaces. For firmly anchoring the insert in the record the same may be provided with radially outwardly extending protuberances 54, 54. Also, a plurality of relatively small apertures 55, 55, may be provided through the disc.

It will be seen that records so produced, will have substantially greater resistance to chipping because of the enlarged metallic area presented by the boss members immediately adjacent the usual central aperture.

Other modifications of the invention may be resorted to without departing from the spirit, thereof or the scope of the appended claims.

What is claimed is:

1. A device for reinforcing the usual central spindle hole of a disc-type phonograph record provided with paper labels thereon, comprising a member having a relatively thin, flat base portion disc member engageable with one side of the record and having an inturned annular flange extending integrally therefrom for reception through said spindle hole, and a second member having a relatively thin disc member engageable with the opposite side of said record and having an integral inturned annular flange, telescopically receivable within said annular flange of the first-named member, said discs having anchoring protuberances on the inner faces thereof adapted to be embedded in the record material to anchor the same thereto the thickness of said discs of said members approximating the thickness of said paper labels, whereby said discs may be incorporated thereon without increasing the overall thickness of said record at any point.

2. A device for reinforcing the usual central spindle hold of a disc-type phonograph record, comprising a member having a relatively thin, flat base portion disc member engageable with one side of the record and having an inturned annular flange extending integrally therefrom for reception through said spindle hole, and a second member having a relatively thin disc member engageable with the opposite side of said record and having an integral inturned annular flange, telescopically receivable within said annular flange of the first-named member, said discs having anchoring protuberances on the inner faces thereof adapted to be embedded in the record material to anchor the same thereto.

References Cited in the file of this patent

UNITED STATES PATENTS

| Number | Name | Date |
|---|---|---|
| 1,755,743 | Morrison | Apr. 22, 1930 |
| 2,501,465 | Caramanoff | Mar. 21, 1950 |